US009782894B2

(12) United States Patent
Ryu et al.

(10) Patent No.: US 9,782,894 B2
(45) Date of Patent: Oct. 10, 2017

(54) HYDRAULIC ROTARY ACTUATOR

(71) Applicant: KNR Systems Inc., Yongin (KR)

(72) Inventors: Sung Moo Ryu, Seongnam (KR); Ki Tak Ahn, Osan (KR); Jeong Whan Moon, Hwaseong (KR); Jung Yeol Kim, Yongin (KR)

(73) Assignee: KNR Systems Inc., Yongin (KR)

( * ) Notice: Subject to any disclaimer, the term of this patent is extended or adjusted under 35 U.S.C. 154(b) by 217 days.

(21) Appl. No.: 14/562,702

(22) Filed: Dec. 6, 2014

(65) Prior Publication Data

US 2016/0046019 A1    Feb. 18, 2016

(30) Foreign Application Priority Data

Aug. 14, 2014  (KR) .......................... 10-2014-0106204

(51) Int. Cl.
*B25J 9/00*  (2006.01)
*B25J 9/14*  (2006.01)
*F15B 15/14*  (2006.01)

(52) U.S. Cl.
CPC ............... *B25J 9/146* (2013.01); *F15B 15/14* (2013.01)

(58) Field of Classification Search
CPC .... F16H 61/688; F16H 37/046; F16H 61/686; F16H 61/04; F16H 3/006; F16H 2200/0069; F16H 2200/0073; F16H 2200/0095; F16H 2200/0078; F16H 2037/048; F16H 2037/049; F16H 2200/2005; F16H 2200/2094
See application file for complete search history.

(56) References Cited

U.S. PATENT DOCUMENTS

| 2,781,027 A | * | 2/1957 | Henry | ..................... F15B 15/12 92/122 |
| 3,014,462 A | * | 12/1961 | Bloom | ..................... F15B 15/12 92/122 |
| 4,825,754 A | * | 5/1989 | Devaud | ..................... F15B 15/12 92/122 |

(Continued)

FOREIGN PATENT DOCUMENTS

| JP | 2001289338 A | * | 10/2001 |
| KR | 10-2009-0112047 A | | 10/2009 |

(Continued)

*Primary Examiner* — Victor MacArthur
(74) *Attorney, Agent, or Firm* — Patent Office of Dr. Chung Park

(57) ABSTRACT

Hydraulic rotary actuator disposes entry and exit lines of the hydraulic fluid within the hydraulic rotary actuator and comprises a floating member with a hollow portion, a rotating member configured to be inserted into the hollow portion, a working fluid supplied to said hollow portion, a servo control valve connected to said floating member configured to control the flow rate, an entry line connected to said servo control valve and further connecting said servo control valve to said floating member, said entry line forming a through-hole that penetrates through said floating member and forming a supply passage for said working fluid, an exit line connecting said hollow portion to said servo control valve and further thereon to outside of floating member, said exit line forming a through-hole that penetrates through said floating member and forming a discharge passage for said working fluid.

9 Claims, 7 Drawing Sheets

(56) References Cited

U.S. PATENT DOCUMENTS

2014/0219771 A1* 8/2014 Henrickson ............... F01D 9/00
  415/1
2015/0226237 A1* 8/2015 Rosplock ............ F15B 15/1485
  92/12.1

FOREIGN PATENT DOCUMENTS

KR         100956849  B1 *  5/2010
KR    10-2011-0113027  A     10/2011

* cited by examiner

HYDRAULIC ROTARY ACTUATOR

CROSS REFERENCES TO PRIOR APPLICATIONS

This application claims priority of Korean Patent Application No. 10-2014-0106204 filed on Aug. 14, 2014, which is hereby incorporated by reference in its entirety.

BACKGROUND OF INVENTION

The present invention relates to a robot arm, more particularly, to a robot arm having a plurality of hydraulic rotary actuators that are controlled by pressurized working fluid.

Hydraulic actuators are smaller and more adapt to precision control in comparison with the more commonly used hydraulic cylinders and have much better output-to-size ratio characteristics than actuators based on electric motors. Rotary motion actuators and linear motion actuators are employed in developing a wide range of robots, such as mobile robots (automatons), wearable robots, heavy duty robot arms and the more recent underwater manipulators that can freely operate in deep sea environments where humans can hardly do so. A rotary actuator with a rotary actuator type joint structure has been disclosed by the same applicant in Korean Patent Application No. 10-2009-0112047.

In order to operate a conventional hydraulic actuator, it was necessary that a pressurized working fluid communicate between the pumping station and the hydraulic actuator through entry and exit lines that were externally exposed in the open.

The externally exposed entry and exit lines of the working fluid may cause problems, such as being very complex to discern and install the numerous lines correctly as well as being limited in motion of the moving structures by the length of the lines. In addition, having the entry and exit lines of the working fluid externally exposed may cause the lines to unintentionally come into contact with the moving structures or other extraneous objects thereby increasing the need for maintenance and repair.

SUMMARY OF INVENTION

One aspect of the present invention is a hydraulic rotary actuator comprising a floating member with a hollow portion, a rotating member configured to be inserted into said hollow portion, said rotating member further configured to be rotated by a working fluid supplied to said hollow portion; a servo control valve coupled to said floating member and configured to control flow rate of said working fluid; an entry line connected to said servo control valve, and further connected to said hollow portion extending from said servo control valve, said entry line forming a hole running through said floating member thereby providing an internal supply passage for said working fluid; an exit line connected to said servo control valve, and further extending to an open exterior of said floating member, said exit line forming a hole running through said floating member thereby providing internal exit passage for said working fluid.

Another aspect of the invention is a hydraulic rotary actuator, further comprising a rotating union configured to supply working fluid that branches from the entry line to pass through and extend to an exterior of the rotating member, and to further adjoin with the exit line.

Another aspect of the invention is a hydraulic rotary actuator further comprising a entry transmission line, forming a through-hole that passes through the rotating member and extends further into the open exterior of said rotating member at one end and in fluid communication with a branch of said entry line passing through said rotating union at the other end; and an exit transmission line, forming a second through-hole that passes through the rotating member and extends further into the open exterior of said rotating member at one end and in fluid communication with a branch of said exit line passing through said rotating union at the other end.

Another aspect of the present invention is a hydraulic rotary actuator further comprising, an entry holding groove that is formed as a circular groove on the outer surface of the rotating union wherein said entry holding groove connects the entry line with the entry transmission line; and an exit holding groove that is formed as second circular groove on the outer surface of the rotating union wherein said exit holding groove connects the exit line with the exit transmission line.

Another aspect of the present invention is a hydraulic rotary actuator further comprising, a first vane protruding from the inner surface of the floating member towards the outer surface of the rotating member, and a second vane protruding from the outer surface of the rotating member towards the inner surface of the floating member, and a concave portion formed where said first vane intersects with inner surface of said floating member, wherein the entry line and the exit line are in fluid communication with said concave portion.

Another aspect of the present invention is a hydraulic rotary actuator further comprising, a first cover coupled to a first end, a support frame coupled to said first cover, wherein the entry line comprises a first entry line, said first entry line configured to penetrate through the support frame and fluidly communicate with a second entry line, said second entry line configured to penetrate through the first cover and fluidly communicate with third entry line, said third entry line configured to penetrate through the floating member and connect with the servo control valve, wherein a fourth entry line penetrates through said floating member, connects with said servo control valve and fluidly communicates with said hollow portion; wherein the exit line comprises a first exit line, said first exit line configured to penetrate through the support frame and fluidly communicate with a second exit line, said second exit line configured to penetrate through the first cover and fluidly communicate with a third exit line, said third exit line configured to penetrate through the floating member and connect with the servo control valve, wherein a fourth exit line penetrates through said floating member, connects with said servo control valve and fluidly communicates with said hollow portion.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

References will be made to embodiments of the invention, examples of which may be illustrated in the accompanying figures. Wherever possible, same reference numbers may be used throughout the drawings to refer to the same or like parts. These figures are intended to be illustrative, not limiting. Although the invention is generally described in the context of these embodiments, it should be understood that it is not intended to limit the scope of the invention to these particular embodiments.

DETAILED DESCRIPTION OF THE PRESENT INVENTION

In the following description, for the purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

A reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

The present invention aims to provide a robotic arm having one or more hydraulic rotary actuators that have built-in internal entry and exit lines for the passage of a working fluid that drives the hydraulic rotary actuator.

In one aspect of the present invention, the hydraulic rotary actuator can be readily assembled and mounted to the robotic arm since, unlike the conventional actuators, the installation of tubing for the entry and exit lines of the working fluid is not necessary.

In another aspect of the present invention, the conventional restrictions on the working range of the entire hydraulic rotary actuator structure imposed by the entry and exit lines of the working fluid are eliminated.

In still another aspect of the present invention, it is possible to readily maintain and repair the entry and exit lines for the working fluid of the hydraulic rotary actuator.

Figure 6:
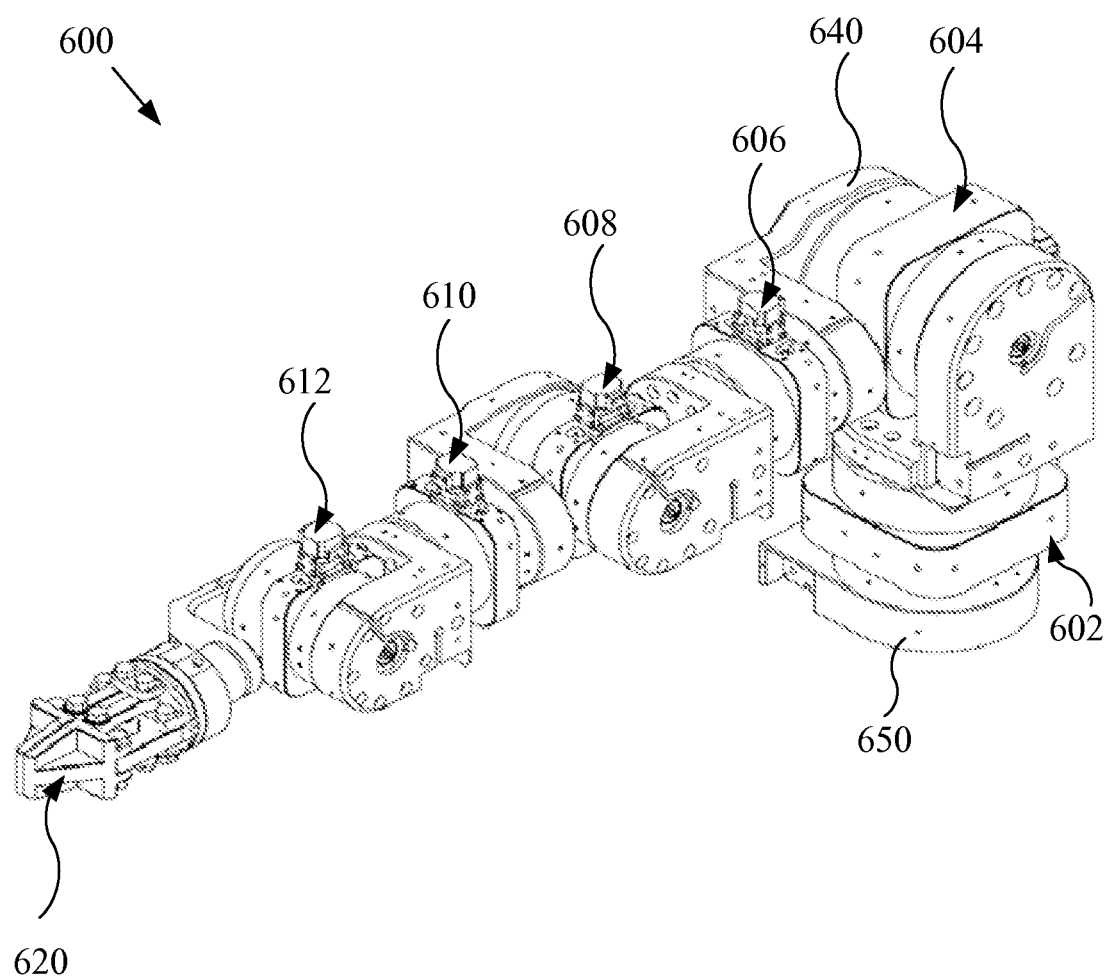
FIG. 6 shows a perspective view of a robotic arm employing the hydraulic rotary actuators in series according to one embodiment of the present invention.

FIG. 6 shows a perspective view of a robotic arm 600 employing a plurality of hydraulic rotary actuators 602-612 in series according to one embodiment of the present invention. As depicted, the robotic arm 600 includes: a base frame 650; hydraulic rotary actuators 602-612; and a gripper 620, where the hydraulic rotary actuator 602 is secured to the base frame 650 and the hydraulic rotary actuator 612 is secured to the base gripper 620. Each of the hydraulic rotary actuators 602-612 may be driven to independently rotate relative to other hydraulic rotary actuators to thereby cause the gripper 620 to perform intended motions. Each hydraulic rotary actuator may be removed from the robot arm 600 or additional hydraulic rotary actuator(s) may be added to the robot arm to meet the size requirement and perform target tasks that the engineer intends to perform. Each hydraulic rotary actuator acts as a modular unit that can be easily assembled into or disassembled from the robotic arm 600.

As depicted in FIG. 6, unlike the conventional hydraulic robotic arms, the robotic arm 600 does not have any external hydraulic line between the hydraulic rotary actuators 602-612. In embodiments, as described below, each of the hydraulic rotary actuators 602-612 has passageways of the working fluid, such as hydraulic oil, so that the hydraulic rotary actuators are in fluid communication through the passageways during operation. A hydraulic pump (not shown in FIG. 6) may be coupled to the base frame 650 through external two pipelines (not shown in FIG. 6), where the base frame 650 provides pressurized working fluid to the hydraulic rotary actuator 602 through internal fluid passageways. Then, the hydraulic rotary actuator 602 in turn communicates the pressurized working fluid to the other hydraulic rotary actuators 604-612 through the passageways of the pressurized working fluid, where the pressurized working fluid (or, shortly working fluid, hereinafter) is used to actuate the hydraulic rotary actuators 602-612.

In embodiments, the gripper 620 is actuated by the pressurized working fluid that is provided by the hydraulic rotary actuator 612.

Figure 1:
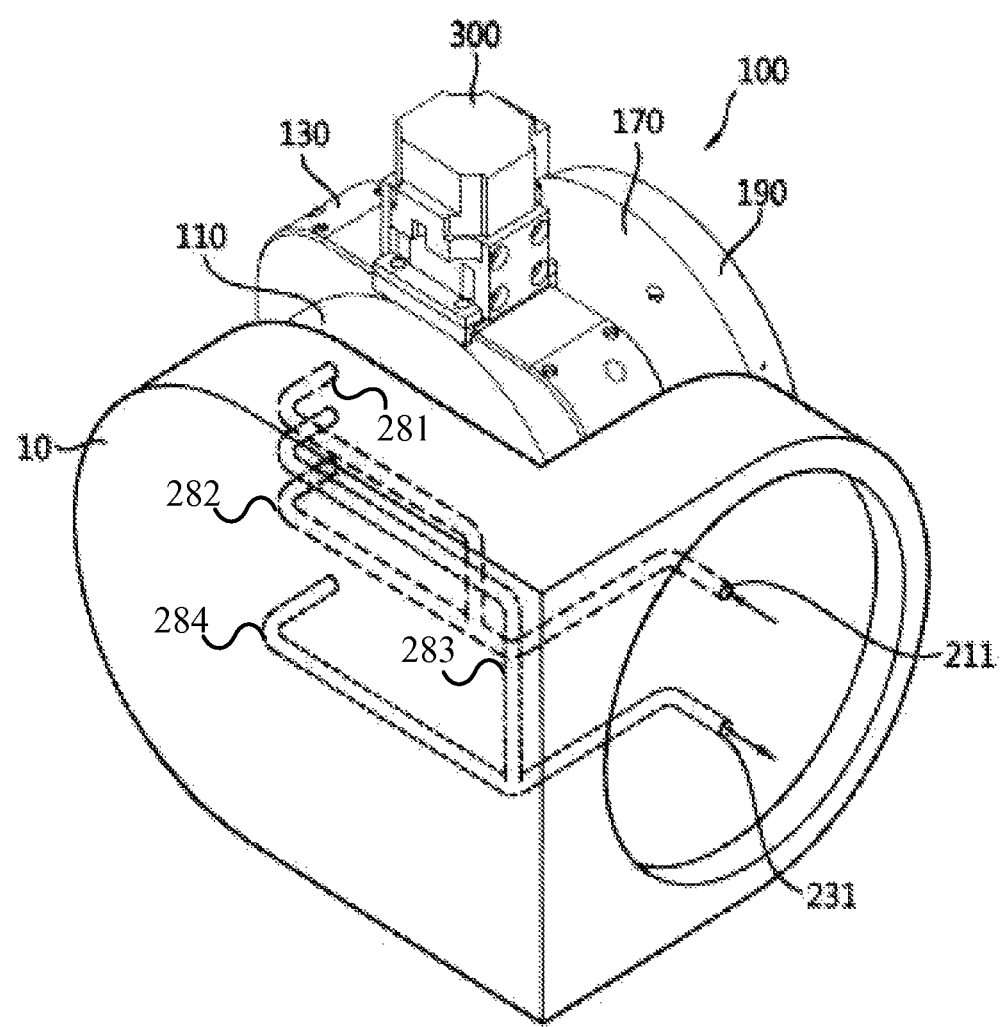
FIG. 1 shows a perspective view of a hydraulic rotary actuator coupled to a support frame according to one embodiment of the present invention.

FIG. 1 shows a perspective view of a hydraulic rotary actuator 100 coupled to a support frame 10 according to one embodiment of the present invention, where each of the hydraulic rotary actuators 602-612 in FIG. 6 may be similar to the hydraulic rotary actuator 100.

The support frame 10 may serve to rigidly support the hydraulic rotary actuator 100 to a part in the robotic arm. For example, the support frame 640 rigidly holds the hydraulic rotary actuator 604 relative to the base frame 650 of the robotic arm 600. The support frame 10 may also serve to couple the hydraulic rotary actuator 100 to a neighboring hydraulic rotary actuator. For example, the support frame 642 couples the hydraulic rotary actuator 608 to the hydraulic rotary actuator 606 while providing fluid communication between the two hydraulic rotary actuators during operation.

Figure 2:
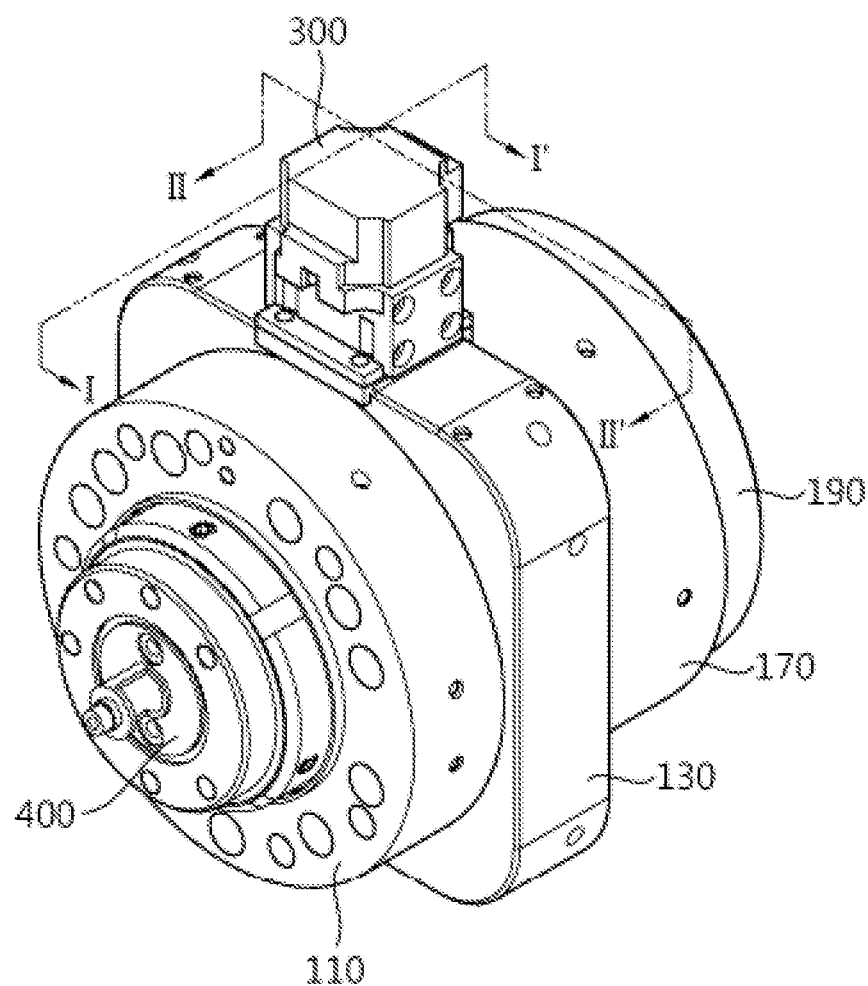
FIG. 2 shows a perspective view of the hydraulic rotary actuator in FIG. 1.
Figure 3:
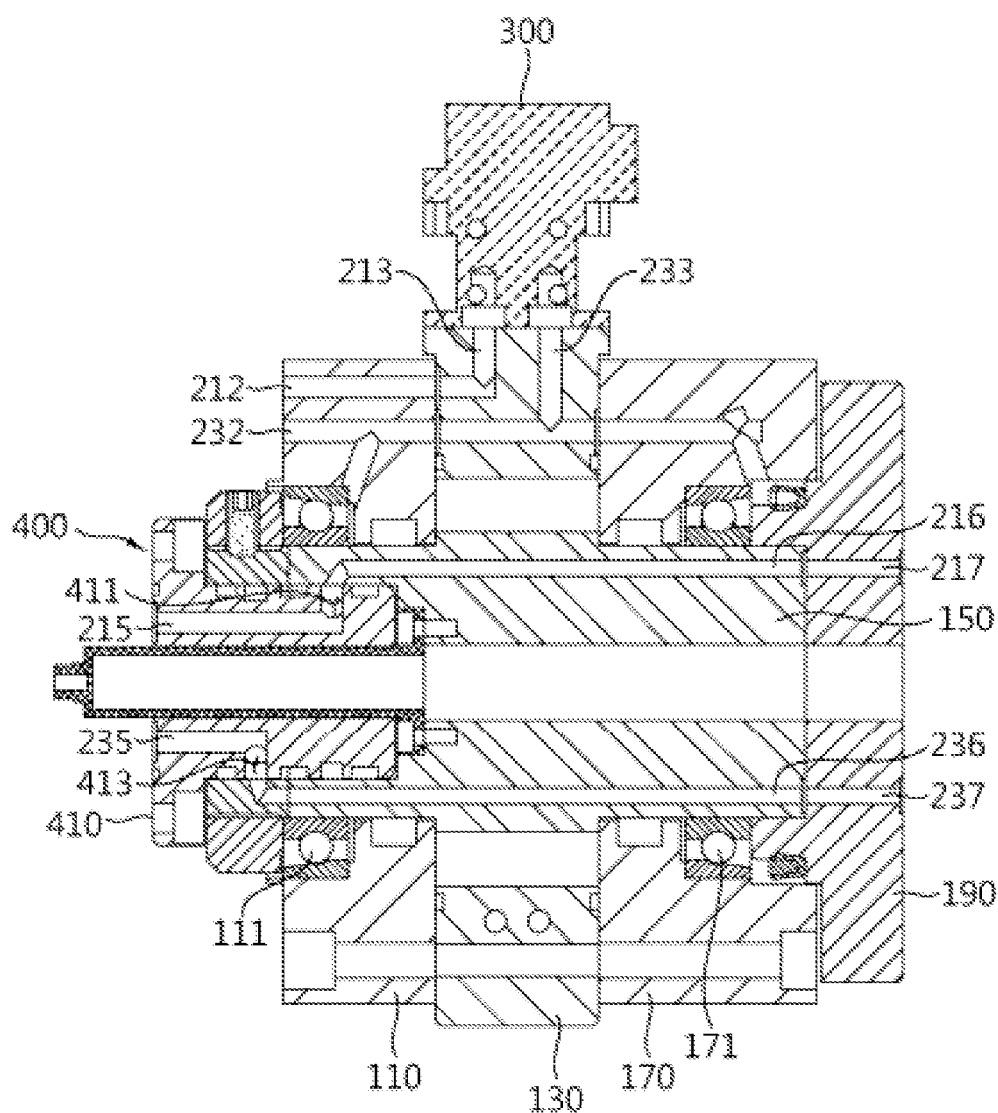
FIG. 3 shows a cross sectional view of the hydraulic rotary actuator taken along the direction I-I' in FIG. 2.
Figure 4:
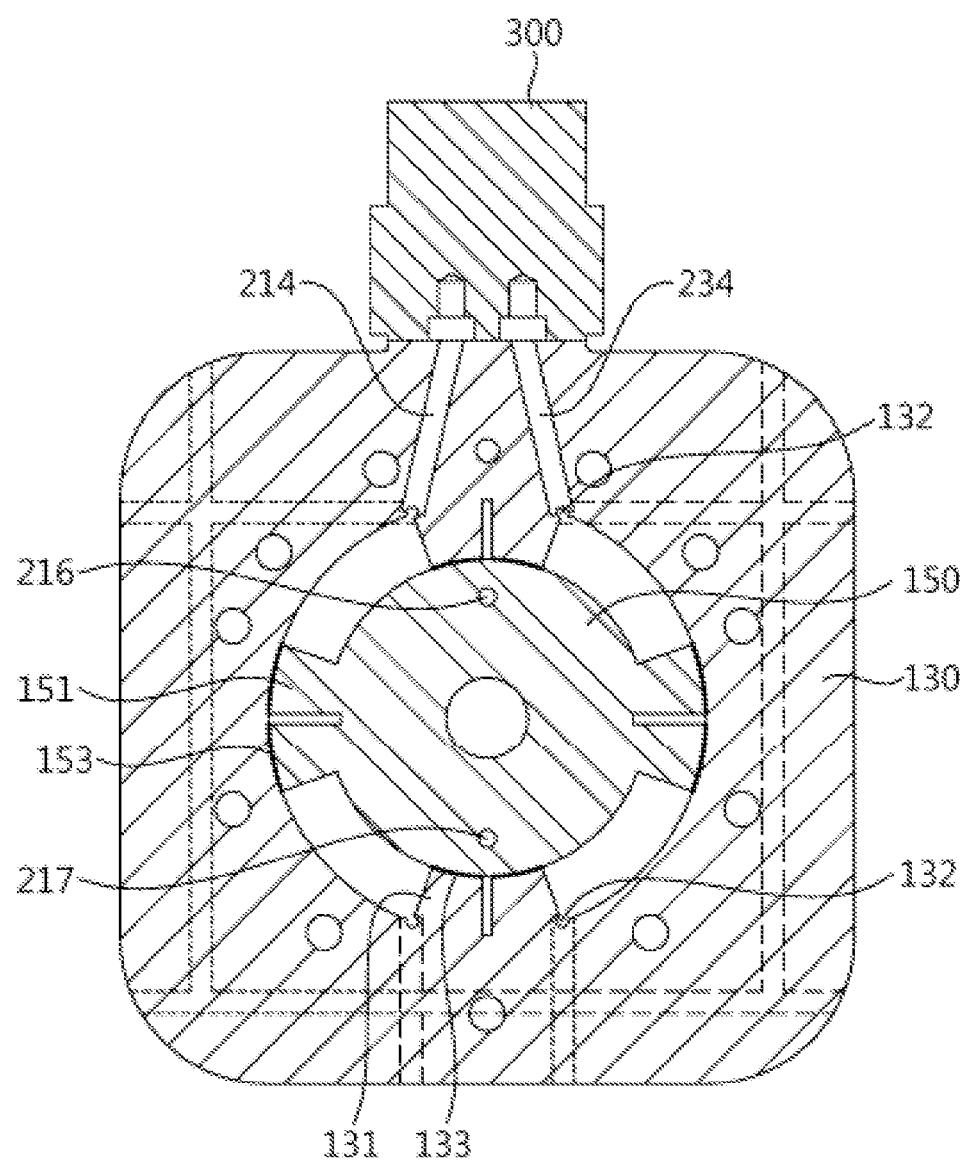
FIG. 4 shows a cross sectional view of the hydraulic rotary actuator taken along the direction II-II' in FIG. 2.

FIG. 2 shows a perspective view of the hydraulic rotary actuator 100 in FIG. 1. FIG. 3 shows a cross sectional view of the hydraulic rotary actuator 100 taken along the direction I-I' in FIG. 2. FIG. 4 shows a cross sectional view of the hydraulic rotary actuator taken along the direction II-II' in FIG. 2.

Referring to FIGS. 2-4, the hydraulic rotary actuator 100 comprises a first cover 110, a floating member 130, a rotating member 150, a second cover 170 and a transmission bracket 190. The first cover 110, floating member 130 and second cover 170 each have matching hollow portions such that the first cover 110, floating member 130 and second cover 170 can be lined up and concentrically assembled in order.

The rotating member 150 comprises a circular tube. The outer diameter of the rotating member 150 is smaller than the inner diameter of the hollow portion of the floating member 130. The rotating member 150 is inserted to concentrically fit into the hollow portion of the floating member 130.

A first vane 131 and a second vane 151 are positioned such that the rotating member 150 can be driven to rotate by a pressurized working fluid introduced between the floating member 130 and the rotating member 150. The first vane 131 protrudes from the inner surface of the hollow portion of the floating member 130 towards the rotating member 150. The second vane 151 protrudes from the outer surface of the rotating member 150 towards the floating member 130.

A concave portion 132 is formed where the first vane 131 intersects with the inner surface of the floating member 130. The concave portion 132 facilitates the flow of the working fluid between the floating member 130 and the rotating member 150 hence preventing any discontinuous behavior during the rotating action. The diameter of the concave portion 132 is best served to be 50% or less of the height of protrusion of the first vane 131.

Sealed sliding layers 133, 153 are formed on the inner surface of the first vane 131 and the outer surface of the second vane, respectively. As the rotating member 150 rotates, the sealed sliding layers 133, 153 facilitate the movement of the outer surface of the rotating member 150 with respect to the inner surface of the first vane 131 and the movement of the outer surface of the second vane 151 with respect to the inner surface of the floating member 130, which are, respectively, in contact.

A first end of the rotating member 150 extends from the hollow portion of the floating member 130 towards first cover 110. The second end of the rotating member 150, likewise, extends from the hollow portion of the floating member towards the second cover 170. A first bearing 111 is disposed at the hollow portion of the first cover 110. The first end of the rotating member 150 is mechanically supported by the first bearing 111. A second bearing 171 is disposed at the hollow portion of the second cover 170. The second end of the rotating member 150 is mechanically supported by the second bearing 171.

A first end of the transmission bracket 190 is secured to the rotating member 150. The second end of the transmission bracket 190 may be secured to the second structure that is another hydraulic rotary actuator, depending on the design of the robotic arm 600. The transmission bracket relays the rotational force of the rotating member to the second structure.

A servo control valve 300 is mounted on the floating member 130. The servo control valve 300 controls the flow rate of the working fluid discharged from between the first and second vanes 131, 151.

The first cover 110 comprises a second entry line 212 which is in fluid communication with the first entry line 211. More specifically, as shown in FIG. 2, the working fluid that enters into the first entry line 211 is separated and flows into two entry passageways 281 and 282 formed inside the support frame 10, where the top entry passageway 281 is directly connected to the second entry line 212 and the bottom entry passageway 282 may be connected to the fifth entry line 215. As explained in conjunction with FIG. 5, the working fluid that flows into the bottom entry passageway 282 may enter into the first entry line 211 of a neighboring hydraulic rotary actuator to thereby actuate the neighboring hydraulic rotary actuator. The floating member 130 comprises a third entry line 213 which is connected to the servo control valve 300 and in fluid communication with the second entry line 212.

The first cover 110 comprises a second exit line 232 which is in fluid communication with the first exit line 231. More specifically, as shown in FIG. 2, two exit passageways 283 and 284 formed inside the support frame 10 merge into one passageway (i.e., the first exit line) 231. The working fluid exiting from the second exit line 232 flows through the top exit passageway 283, while the working fluid discharged from the first exit line 231 of a neighboring hydraulic rotary actuator may flow through the bottom exit passageway 284 (via 237 and 235) of the current hydraulic rotary actuator. The floating member 130 comprises a third exit line 233 which is connected to the servo control valve 300 and in fluid communication with the second exit line 232.

A first entry line 211, through which the working fluid enters toward the hydraulic rotary actuator 100, and a first exit line 231, through which the working fluid exits from the hydraulic rotary actuator 100, may be formed in the support frame 10. The first entry line 211 and the first exit line 231 may be through-holes that penetrate through the support frame 10. When the hydraulic rotary actuator 100 is assembled into a robotic arm to be in direct contact with a neighboring hydraulic rotary actuator, the ends of the first entry line 211 and the first exit line 231 are directly connected to an end of the second entry transmission line 217 and an end of the second exit transmission line 237 of the neighboring hydraulic rotary actuator, respectively, using sealing rings (not shown in FIG. 1). Since the two neighboring hydraulic rotary actuators are in fluid communication through the ends (or ports) of the transmission lines 217 and 237, the hydraulic rotary actuator 100 does not need the conventional exterior exposure of any hydraulic piping, tubing or equivalents thereof outside the support frame 10.

The floating member 130 comprises a fourth entry line 214 which is in fluid communication with a concave portion 132 at the end of the connection away from the servo control motor 300. In addition, the floating member 130 comprises a fourth exit line 234 which is in fluid communication with another concave portion 132 at the end of the connection away from the servo control motor 300. The fourth entry line 214 and the fourth exit line are both branched out and penetrate through the floating member 130, respectively, at its periphery around the hollow portion thereby forming at least one open entry line service hole and at least one exit line service hole. These open service holes allow manual opening or closing of the holes and manual adjustment of pressure in the entry and exit lines hence facilitating the servicing and maintenance of the respective entry and exit lines.

As described in detail above, the first entry line 211 and first exit line 231 both penetrate through and form passageways within the support frame 10. Likewise, it is preferable that the second, third and fourth entry lines 212, 213, 214 and the second, third and fourth exit lines 232, 233, 234, all penetrate through and form passageways within the first cover 110 and floating member 130.

In embodiments, a hydraulic rotary actuator 612 may be operated between the hydraulic rotary actuator 610 and an object, where the object may be a gripper 620 having any suitable shape. For instance, the gripper 620 is in fluid communication through the ends (or ports) of the transmission lines 217 and 237, so that the gripper is actuated by the pressurized fluid. Alternatively, in embodiments, the hydraulic rotary actuator 610 may be operated between two hydraulic rotary actuators 608 and 612 of the robotic arm 600 having a multi-joint structure.

Hereinafter, for the sake of understanding and convenience of description, the hydraulic rotary actuator, such as 610, disposed between two hydraulic rotary actuators 608 and 612, will be called the first hydraulic rotary actuator and the hydraulic rotary actuator, such as 612, disposed between a hydraulic rotary actuator 610 and an object, as for instance a gripper 620, will be called the second hydraulic rotary actuator.

Figure 5:
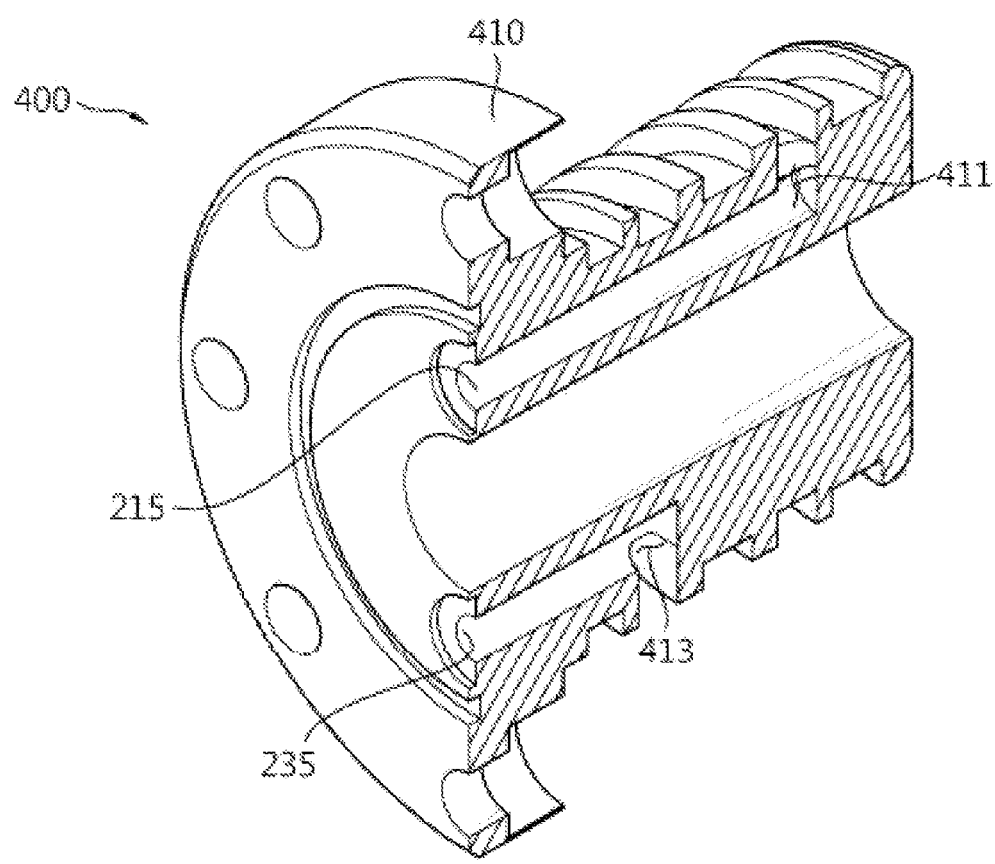
FIG. 5 shows a perspective cutaway view of the rotating union of the hydraulic rotary actuator in FIG. 1.

Referring to FIGS. 3 and 5, the first hydraulic rotary actuator, say 610, comprises a rotating union 400. The rotating union 400 not only serves to supply working fluid to the neighboring hydraulic rotary actuator, say 612, but also to collect working fluid being discharged from the neighboring hydraulic rotary actuator, in a smooth manner, even when the rotating member 150 (of the first hydraulic actuator) is being rotated.

More specifically, the rotating union 400 comprises a cylindrical body. Cylindrical body 410 is concentrically connected to the rotating member 150 at a first end. A fifth entry line 215 which branches from the first entry line 211 is disposed in the cylindrical body 410. An entry holding groove 411 is formed as an annular groove on the outer surface of the cylindrical body 410 and is in fluid communication with the fifth entry line 215. Similarly, an exit holding groove 413 is formed as an annular groove on the outer surface of the cylindrical body 410 and is in fluid communication with the fifth exit line 235 that is in turn connected to the bottom exit passageway 284.

A first entry transmission line 216 is formed as a through-hole along the length of the rotating member 150 and is in fluid communication with the entry holding groove 411. Similarly a first exit transmission line 236 is formed as a through-hole along the length of the rotating member 150 and is in fluid communication with the output holding groove 413. A second entry transmission line 217 is formed as a through-hole within the transmission bracket 190 and is in fluid communication with the first entry transmission line 216. Similarly a second exit transmission line 237 is formed as a through-hole within the transmission bracket 190 and is in fluid communication with the first exit transmission line 236.

The configuration of the second hydraulic rotary actuator 100 is similar to the configuration of the first hydraulic rotary actuator having the rotating union 400. It is preferable to have the entry and exit lines be formed internally as through-holes and prevent the entry and exit lines being exposed to the open exterior.

Hereinafter, the operation of the hydraulic rotary actuator according to one embodiment is described with reference to the accompanying drawings.

The working fluid is supplied to the first entry line 211. The working fluid then passes through the interior of the support frame 10 and is supplied to the second entry line 212 via the top entry passageway 281. The working fluid then passes through the interior of the first cover 110 along entry line 212 and is supplied to the third entry line 213. The working fluid then passes through the interior of the floating member 130 and is supplied to the servo control valve 300.

The flow rate of the working fluid is controlled by the servo control valve 300. The controlled flow of the working fluid then passes through the interior of the floating member 130 along the path of the fourth entry line 214 and is supplied to the concave portion 132. The rotation angle of the rotating member 150 is controlled by the flow rate of the working fluid supplied to the concave portion 132. The transmission bracket 190 rotates together with the rotating member 150. The neighboring hydraulic rotary actuator or object, such as a gripper 620, is secured to the transmission bracket 190 and therefore rotates together with the transmission bracket 190 with respect to the floating member 130.

For control of rotation angle, the working fluid supplied and occupying the space between the first and second vanes 131, 151 may discharge whereby the servo control valve 300 controls the opening and closing of the fourth exit line 234.

On discharge of the working fluid, the servo control valve 300 opens the fourth exit line 234. The working fluid passes through the interior of the floating member 130 along the fourth exit line 234 and is discharged into the servo control valve 300. The working fluid then passes through the servo control valve 300 and is discharged into the third exit line 233. The working fluid then passes through the interior of the floating member 130 along the third exit line and is discharged into the second exit line 232. The working fluid further passes through the interior of the first cover 110 along the second exit line 232 and enters into the top exit passageway 283 and is then discharged into the first exit line 231. The working fluid then passes through the interior of the support frame along first exit line 231 and is further discharged either to a neighboring hydraulic rotary actuator or a pipeline connected to a hydraulic pump (not shown in FIG. 6).

In the case where a hydraulic rotary actuator 100 is mounted nearby another neighboring hydraulic rotary actuator, the working fluid supplied along the first entry line 211 can be branched off from the first entry line 211 into the bottom entry passageway 282 and then flows into a parallel fifth entry line 215. The working fluid passes through the interior of the cylindrical body 410 of the rotating union 400 along the fifth entry line and is supplied to the entry holding groove 411. The working fluid is then supplied to the first entry transmission line 216 from the entry holding groove. The working fluid then passes through the interior of the rotating member 150 along the first entry transmission line 216 and is supplied to the second entry transmission line 217. From there, the working fluid then passes through the interior of the transmission bracket 190 along the second entry transmission line 217. Thereon, the working fluid passes through the first entry line 211 of the neighboring hydraulic rotary actuator.

When the working fluid from the neighboring hydraulic actuator is discharged through the first exit line 231 of the neighboring hydraulic rotary actuator, the discharged working fluid flows into the second exit transmission line 237 of the current hydraulic rotary actuator. The working fluid then passes through the interior of the transmission bracket 190 along the second exit transmission line 237 and is discharged into the first entry transmission line 236. Thereafter, the working fluid passes through the interior of the rotating body 150 along the first exit transmission line and is discharged into the discharge holding groove 413. Thereon the working fluid is discharged into the fifth exit line 235 and passes through the rotating union 400 along the fifth exit line 235 and then passes through the bottom exit passageway 284 to be admixed with the working fluid from the top exit passageway 283. The working fluid further passes through the interior of the support frame 10 along the first exit line 231 and may be further discharged to the neighboring hydraulic rotary actuator or an exit pipeline connected to a hydraulic pump (not shown in FIG. 6). It is noted that the hydraulic pump (not shown) may provide the pressurized working fluid to the hydraulic rotary actuator 602 (more specifically, the first entry line 211 of the hydraulic rotary actuator 602) through an entry pipeline (not shown) via base frame 650.

Figure 7:
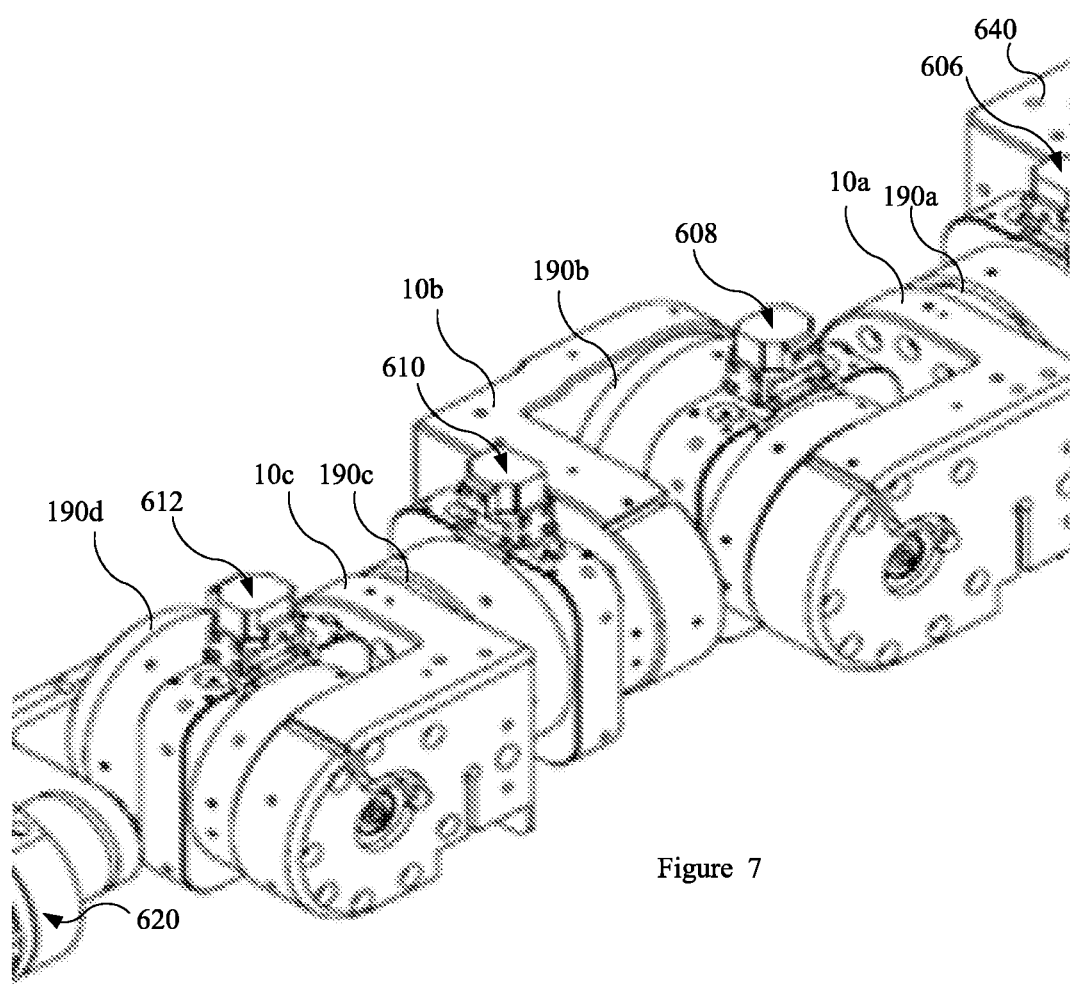
FIG. 7 shows an enlarged view of a portion of FIG. 6 according to one embodiment of the present invention.

FIG. 7 shows an enlarged view of a portion of the robotic arm 600 in FIG. 6 according to one embodiment of the present invention. As depicted, each of the four hydraulic rotary actuators 606, 608, 610 and 612 includes a support frame and a transmission bracket, and a support frame of a hydraulic rotary actuator is connected to a transmission bracket of a neighboring hydraulic rotary actuator. For instance, the hydraulic rotary actuator 610 includes a support frame 10*b* that is connected to the transmission bracket 190*b* of the neighboring hydraulic rotary actuator 608. Also, the support frames 10*a* and 10*c* are connected to the transmission brackets 190*a* and 190*c*, respectively. The transmission bracket 190*d* is connected to the gripper 620.

As described above, the first entry line 211 and the first exit line 231 of the support frame (e.g. 10*b*) (in FIG. 1) are in direct contact with the second entry transmission line 217 and the second exit transmission line 237 of the transmission bracket 190*b* (in FIG. 3), respectively, so that the two neighboring hydraulic rotary actuators have fluid communication therebetween during operation.

As described above, the hydraulic rotary actuator according to the present embodiment keeps the tubing or passage lines for supplying or discharging the working fluid within the confines of the given structures of the hydraulic rotary actuator thereby preserving them from exterior exposure.

Therefore, the hydraulic rotary actuator according to the present embodiment does not need installation of separate hydraulic fluid supply or discharge lines or tubing, thereby making it easy to assemble and install, giving it more range of movement less the hydraulic tubing and making it easier to operate, maintain and repair. In embodiments, the only external lines needed to operate the robotic arm 600 are the fluid pipelines for connecting the hydraulic pump to the hydraulic rotary actuator 602 via the base frame 650. In embodiments, unlike the conventional hydraulic robotic arms, tubing or pipelines between the hydraulic pump to hydraulic rotary actuators 602-612 are not needed. In embodiments, unlike the conventional hydraulic robotic arms, tubing or pipelines between the hydraulic rotary actuators is not needed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A hydraulic rotary actuator, comprising:
a support frame having a first entry line and a first exit line, the first entry line having a first inlet through which fluid enters the hydraulic rotary actuator from outside the hydraulic rotary actuator, the first exit line having a first outlet through which fluid exits the hydraulic rotary actuator;
a floating member having a hollow portion, a second entry line, a second exit line, a third entry line and a third exit line, the second entry line being in fluid communication with the first entry line and the third entry line, the second exit line being in fluid communication with the first exit line and the third exit line;
a rotating member rotatably mounted inside the hollow portion and having multiple vanes that form first and second chambers between the floating member and the rotating member, the third entry line and the third exit line of the floating member being in fluid communication to the first and second chambers, respectively;
a servo control valve coupled to said floating member and rotating the rotating member relative to the floating member by controlling flows of fluid through the third entry line and the third exit line to thereby change volumes of the first and second chambers; and
a transmission bracket connected to the rotating member and including an entry transmission line that is in fluid communication with the first entry line of the support frame and has a second outlet through which fluid exits the hydraulic rotary actuator and an exit transmission line that is in fluid communication with the first exit line of the support member and has a second inlet through which fluid enters the hydraulic rotary actuator from outside the hydraulic rotary actuator, wherein a portion of fluid entering through the first inlet of the first entry line exits the hydraulic rotary actuator through the second outlet of the entry transmission line and wherein fluid that enters the hydraulic rotary actuator through the second inlet of the exit transmission line exits the hydraulic rotary actuator through the first outlet of the first exit line,
wherein, when a second hydraulic rotary actuator having a support frame that has a first inlet and a first outlet and a transmission bracket that has a second inlet and a second outlet is assembled to the hydraulic rotary actuator, the second outlet of the hydraulic rotary actuator makes a direct contact with the first inlet of the second hydraulic rotary actuator and the second inlet of the hydraulic rotary actuator makes a direct contact with the first outlet of the second hydraulic rotary actuator.

2. The hydraulic rotary actuator according to claim 1, further comprising:
a rotating union connected to the support frame and having a fourth entry line that is in fluid communication with the first entry line of the support frame and the entry transmission line of the transmission bracket and a fourth exit line that is in fluid communication with the first exit line of the support frame and the exit transmission line of the transmission bracket.

3. The hydraulic rotary actuator according to claim 2, wherein the fourth entry line of the rotating union includes an entry holding groove that is formed as a circular groove on an outer surface of the rotating union, and
the fourth exit line of the rotating union includes an exit holding groove that is formed as second circular groove on the outer surface of the rotating union.

4. The hydraulic rotary actuator according to claim 1, further comprising:
a first vane protruding from an inner surface of the floating member towards an outer surface of the rotating member; and
a concave portion formed where said first vane intersects with an inner surface of said floating member;
wherein the fluid flowing through the third entry line of the floating member enters the first chamber via the concave portion.

5. The hydraulic rotary actuator according to claim 1, further comprising:
a first cover coupled to the support frame and including a fifth entry line and a fifth exit line, the fifth entry line connects the first entry line of the support frame to the second entry line of the floating member and the fifth exit line connects the first exit line of the support frame to the second exit line of the floating member.

6. The hydraulic rotary actuator according to claim 1, wherein, the support frame includes a recessed portion that receives the transmission bracket of the second hydraulic rotary actuator when the second hydraulic rotary actuator is assembled to the hydraulic rotary actuator.

7. A hydraulic rotary actuator, comprising:
a support frame having a first inlet through which fluid enters the hydraulic rotary actuator from outside the hydraulic rotary actuator and a first outlet through which fluid exits the hydraulic rotary actuator;
a floating member connected to the support frame and having a hollow portion thereinside;
a rotating member rotatably disposed inside the floating member;
a servo control valve connected to the floating member and controlling a rotation of the rotating member relative to the floating member; and
a transmission bracket secured to the rotating member and having a second outlet through which a portion of the fluid entering the first inlet exits the hydraulic rotary actuator and a second inlet through which fluid enters the hydraulic rotary actuator from outside the hydraulic rotary actuator, the fluid entering through the second inlet exits the hydraulic rotary actuator through the first outlet.

8. The hydraulic rotary actuator according to claim 7, wherein, when a second hydraulic rotary actuator having a support frame that has a first inlet and a first outlet and a transmission bracket that has a second inlet and a second outlet is assembled to the hydraulic rotary actuator, the second outlet of the hydraulic rotary actuator makes a direct contact with a first inlet of the second hydraulic rotary actuator, and second inlet of the hydraulic rotary actuator makes a direct contact with a first outlet of the second hydraulic rotary actuator.

9. The hydraulic rotary actuator according to claim 8, wherein the support frame includes a recessed portion that receives the transmission bracket of the second hydraulic rotary actuator when the second hydraulic rotary actuator is assembled to the hydraulic rotary actuator.

* * * * *